J. H. MAHER.
AGRICULTURAL IMPLEMENT.
APPLICATION FILED MAY 22, 1914.

1,157,709.

Patented Oct. 26, 1915.

WITNESSES:
Beulah Carle
D Swass

INVENTOR
James H. Maher,
BY Frederick W. Cameron.
ATTY.

UNITED STATES PATENT OFFICE.

JAMES H. MAHER, OF SLINGERLANDS, NEW YORK.

AGRICULTURAL IMPLEMENT.

1,157,709.  Specification of Letters Patent.  Patented Oct. 26, 1915.

Application filed May 22, 1914. Serial No. 840,143.

*To all whom it may concern:*

Be it known that I, JAMES H. MAHER, a citizen of the United States of America, residing at Slingerlands, in the county of Albany and State of New York, have invented certain new and useful Improvements in Agricultural Implements, of which the following is a specification.

Figure 1:
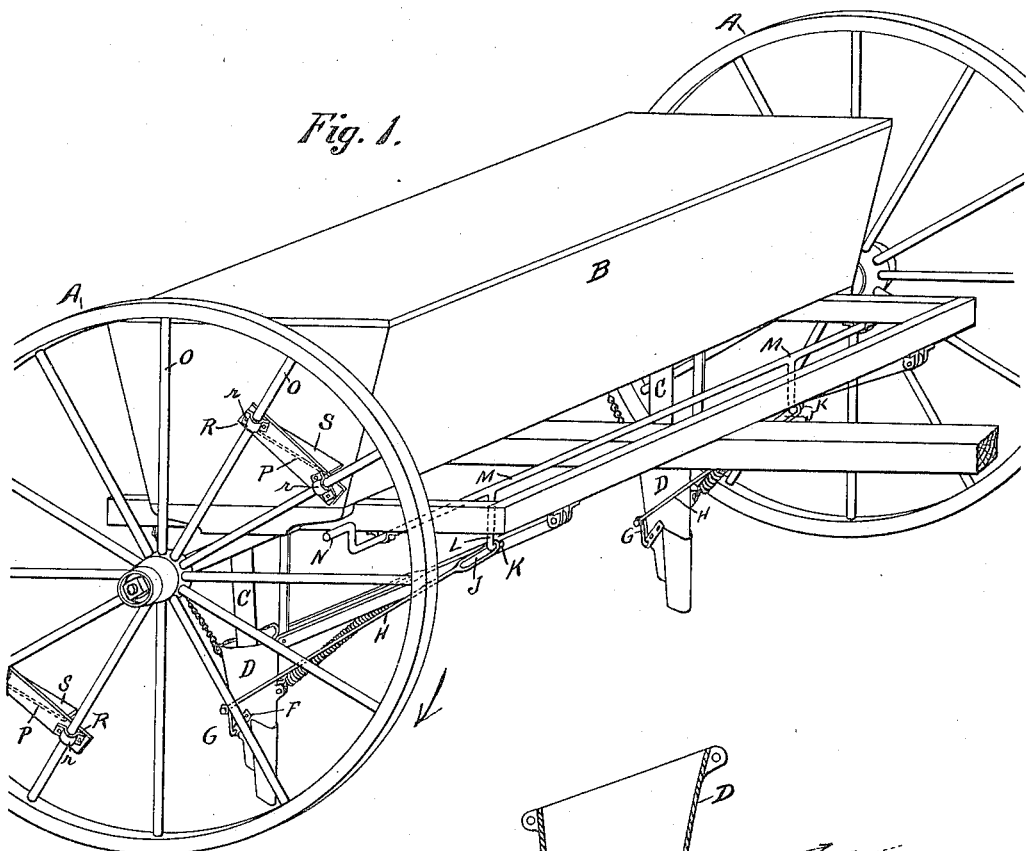
Figure 2:
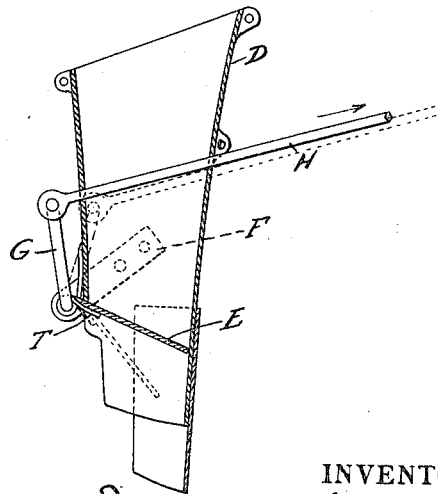

My invention relates to agricultural implements, and the object of my invention is to provide a corn planter so arranged that a number of grains of corn may be deposited in the ground at certain definite intervals; together with such elements and combinations as are hereinafter more particularly set forth and claimed. I accomplish these objects by means of the mechanism illustrated in the accompanying drawing, in which:

Figure 1 is a perspective view of a grain drill provided with my invention. Fig. 2 is a detail sectional view, with parts broken away, of my invention.

Similar letters refer to similar parts throughout the several views.

To a grain drill of the usual construction, which is provided with wheels, A, A, feed box, B, distributing pipes, C, hoe, D, and apparatus not shown, for delivering the grain from the feed box into the hoe, as is customary in devices of this kind, I arrange in the hoe, D, a gate, E, for the purpose of holding the grain in the hoe until such time as I shall open the gate, which I arrange to do at certain specified intervals as follows:—I hinge the gate in connection with the arm, F, and secure to the gate beyond the hinge an arm, G, secured to an operating rod, H, which has at one end an elongated eye, J, which is threaded onto an arm, K, which is attached to the braces, L, secured to the rocker arm, M. At one end of the rocker arm, M, is a crank, N, which extends beyond the end of the feed box, B, and projects almost to the spokes, O, of one of the wheels, A. On the spokes, O, of the wheel, I secure an obstruction, P, adapted to engage the crank arm, N, causing it to rock as the wheel goes in the direction shown by the arrow which will press the crank, N, backward, move the arm, K, forward and therefore move the rod, H, in the direction shown by the arrow in Fig. 2, which will cause the gate, E, to open and assume the position shown by dotted lines in said Fig. 2.

For the purpose of closing the gate, E, I place the spring, T, in contact with the gate and the side of the hoe, D, as shown in Fig. 2, the resiliency of the spring tending to lift the gate, E, to its normal position shown in full lines in said figure.

The obstruction, P, is preferably on the block, R, extending from one spoke to another adjacent spoke and secured to the spoke by suitable straps, r, r, or in any substantial manner. To the block, R, I attach a guide strip, S, placed diagonally from one end of the block to the other and projecting toward the feed box, and in such position that as the wheel rotates in the direction of the arrow, the guide strip, S, will engage the crank and as the wheel advances the crank will come in contact with first a portion of the guide strip, S, which is nearest the circumference of the wheel and as the wheel advances the crank will be forced backward, because the portions of the strip farthest from the circumference will engage the crank as the wheel rotates in the forward direction. This will raise the arm, K, and open the gate, E, permitting the grain therein to spill out. In case the grain drill should be moved in the opposite direction or "backed", I have provided the elongated eye, J, in the operating rod, H, which when the crank arm, N, is forced in the opposite direction from that in which it is moved when the wheel is going forward, will permit the arm, K, to move in the eye, J, instead of forcing the rod, H, in the opposite direction from that shown by the arrow in Fig. 2, which of course would either break or severely strain the parts.

I have shown but two obstructions, P, on the wheel, A, but in use I will have more, and do not limit myself to any number. The position of the obstructions on the wheel determines the frequency with which the gate will be opened and therefore the distance between the hills of corn.

What I claim as my invention and desire to secure by Letters Patent is:

1. In a grain drill a valve operating means, comprising a rod attached to the valve provided at one end with an eye; means for threading said eye in connection with a rocker arm; a rocker arm attached to and extending across the drill; a crank on the end of said rocker arm; an obstruction attached to the wheel adapted to engage said crank, said obstruction comprising a block extending from one spoke of the wheel to an adjacent spoke; means for securing the block to the spokes; and a guide strip placed diagonally from one end of said block to the other and projecting from the block.

2. In a grain drill a valve operating means, comprising a rocker arm; a crank on said rocker arm; an obstruction on the wheel adapted to engage said crank, comprising a block extending from one spoke of the wheel to an adjacent spoke; means for securing the block to the spokes; and a guide strip placed diagonally from one end of said block to the other and projecting from the block.

In testimony whereof I have affixed my signature in presence of two witnesses.

JAMES H. MAHER.

Witnesses:
FREDERICK W. CAMERON,
BEULAH CARLE.

Copies of this patent may be obtained for five cents each, by addressing the "Commissioner of Patents, Washington, D. C."